United States Patent
Jayaramachar et al.

(10) Patent No.: US 12,407,575 B2
(45) Date of Patent: Sep. 2, 2025

(54) METHODS, SYSTEMS, AND COMPUTER READABLE MEDIA FOR AUTOMATICALLY TRIGGERING NETWORK SLICE SELECTION ASSISTANCE INFORMATION (NSSAI) AVAILABILITY INFORMATION UPDATES WITH NETWORK SLICE SELECTION FUNCTION (NSSF)

(71) Applicant: Oracle International Corporation, Redwood Shores, CA (US)

(72) Inventors: Amarnath Jayaramachar, Bangalore (IN); Sairam Sudhir Pokkunuri, Bangalore (IN); Akhil Kumar Khare, Monmouth Junction, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 371 days.

(21) Appl. No.: 17/962,282

(22) Filed: Oct. 7, 2022

(65) Prior Publication Data

US 2024/0121157 A1  Apr. 11, 2024

(51) Int. Cl.
*H04L 41/12* (2022.01)
*H04L 41/40* (2022.01)
*H04W 48/14* (2009.01)

(52) U.S. Cl.
CPC .............. *H04L 41/12* (2013.01); *H04L 41/40* (2022.05)

(58) Field of Classification Search
None
See application file for complete search history.

(56) References Cited

U.S. PATENT DOCUMENTS

| | | | |
|---|---|---|---|
| 2019/0029065 A1* | 1/2019 | Park | H04W 48/18 |
| 2022/0394595 A1* | 12/2022 | Zhu | H04W 12/08 |
| 2023/0025799 A1* | 1/2023 | Goel | H04W 48/18 |
| 2023/0354165 A1* | 11/2023 | Sempere | H04W 48/18 |

(Continued)

OTHER PUBLICATIONS

5G; 5G System; Technical Realization of Service Based Architecture; Stage 3 (3GPP TS 29.500 version 17.7.0 Release 17) (Year: 2022).*

(Continued)

*Primary Examiner* — Gregory B Sefcheck
*Assistant Examiner* — Benjamin Peter Welte
(74) *Attorney, Agent, or Firm* — Jenkins, Taylor & Hunt, P.A.

(57) ABSTRACT

A method for automatically triggering network slice selection assistance information (NSSAI) availability information updates with a network slice selection function (NSSF) includes receiving, from an access and mobility management function (AMF), a service request message. The method further includes determining, that the NSSAI availability information for the AMF is not present in an NSSAI availability information database maintained by the NSSF. The method further includes sending, to the AMF, a message for triggering the AMF to update its NSSAI availability information with the NSSF, receiving, an NSSAI Availability PUT request including NSSAI availability information for the AMF, and updating, the NSSAI availability information database to include the NSSAI availability information for the AMF.

20 Claims, 9 Drawing Sheets

(56) References Cited

U.S. PATENT DOCUMENTS

2024/0284377 A1* 8/2024 Tiwari ................. H04W 48/18
2024/0298253 A1* 9/2024 Talebi Fard .......... H04W 48/18

OTHER PUBLICATIONS

3rd Generation Partnership Project; Technical Specification Group Core Network and Terminals; 5G System; Network Slice Selection Services; Stage 3 (Release 17) (Year: 2022).*

"3rd Generation Partnership Project; Technical Specification Group Core Network and Terminals; 5G System; Network Slice Selection Services; Stage 3 (Release 17)," 3GPP TS 29.531, V17.5.0, pp. 1-82 (Jun. 2022).

"3rd Generation Partnership Project; Technical Specification Group Core Network and Terminals; 5G System; Network Function Repository Services; Stage 3 (Release 17)," 3GPP TS. 29.510, V17.6.0, pp. 1-306 (Jun. 2022).

* cited by examiner

METHODS, SYSTEMS, AND COMPUTER READABLE MEDIA FOR AUTOMATICALLY TRIGGERING NETWORK SLICE SELECTION ASSISTANCE INFORMATION (NSSAI) AVAILABILITY INFORMATION UPDATES WITH NETWORK SLICE SELECTION FUNCTION (NSSF)

TECHNICAL FIELD

The subject matter described herein relates to network slice services in a communications network. More particularly, the subject matter described herein relates to methods, systems, and computer readable media for automatically triggering NSSAI availability information updates with the NSSF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

In 5G networks, network slicing allows producer NFs to divide their resources into portions, which are referred to as network slices, that can be accessed by consumer NFs on a per-slice basis. Access and mobility management functions (AMFs) register information that network slice consumers can use to access network slices with a network slice selection function (NSSF). The information that is registered with the NSSF identifies network slices supported by each AMF and is referred to as network slice selection assistance information (NSSAI) availability information. The NSSF provides Nnssf_NSSelection service (also referred to herein as the NSSelection service), which provides requesting NFs with NSSAI availability information for a given AMF. The NSSF also provides Nnssf_NSSAIAvailability service (also referred to herein as the NSSAIAvailability service), which allows AMFs to update their NSSAI availability information with the NSSF. The NSSAIAvailability service also allows network slice service consumers to subscribe to and be notified of changes in status of NSSAI availability information. In one example, a subscribing NF can subscribe, on a per tracking area (TA) basis, to be notified of changes in status of single network slice selection assistance information (S-NSSAIs) per TA. An S-NSSAI is a unique identifier for a network slice. A TA is a group of cells or gNodeBs (gNBs).

One problem that can occur is that the NSSAI availability information database maintained by the NSSF may lose its data or not be up to date in a dynamically changing network environment. In some network deployments, there will be multiple AMFs deployed that use the NSSelection and NSSAIAvailability services provided by the NSSF. Each AMF sends its NSSAI availability information to the NSSF using the NSSAIAvailability service. Other AMFs can access the NSSAI availability information from that NSSF through subscription via the NSSAIAvailability service. Also, AMFs can trigger NSSelection service requests towards the NSSF during initial registration and in packet data unit (PDU) session establishment scenarios. The NSSF uses the NSSAI availability information for generating responses for the NSSelection service operation. It is possible that the NSSAI availability information database at the NSSF is empty or out of date. The NSSAI availability information database may be empty because the NSSF is an optional NF in 5G deployments and may be introduced in the network after an initial AMF deployment. In such a case where AMFs are deployed in the network before the NSSF, the AMFs will not have provided or updated NSSAI availability information with the NSSF. As a result, the NSSAI availability information database at the NSSF will be empty. Another scenario where the NSSAI availability information database at the NSSF will be empty is if the NSSF experiences a service outage and loses its NSSAI availability information. In these scenarios, there is no 3GPP-defined method to build/rebuild the NSSAI availability information in the NSSF that forces AMFs to trigger/re-trigger NSSAI-Availability update service requests to the NSSF.

Accordingly, there exists a need for methods, systems, and computer readable media for triggering NSSAI availability information updates with the NSSF.

SUMMARY

According to an aspect of the subject matter described herein, the NSSF causes the AMF to trigger/re-trigger an NSSAIAvailability update service request to the NSSF in order to build/rebuild the NSSAI availability information database. In one example, the NSSF may provide the indication to retrigger the NSSAIAvailability service in a response to the NSSelection service operation. In another example, the NSSF may provide an indication to the requesting NF to provide its NSSAI availability information in a response to an NSSAIAvailability PATCH request. In response to receiving the trigger indication, the AMF will trigger/retrigger an NSSAIAvailability update service request to the NSSF. Over time, based on the trigger indications, the AMFs in the network seeking to access NSSAI availability information for other NFs will build or rebuild the NSSAI availability information database at the NSSF by providing their NSSAI to the NSSF so that NSSelection and NSSAIAvailability service requests can be successfully processed by the NSSF.

A method for automatically triggering network slice selection assistance information (NSSAI) availability information updates with a network slice selection function (NSSF) include receiving, at an NSSF and from an access and mobility management function (AMF), a service request message. The method further includes determining, by the NSSF, that NSSAI availability information for the AMF is not present in an NSSAI availability information database maintained by the NSSF. The method further includes, in response to determining that the NSSAI availability information is not present in the NSSAI availability information database, sending, by the NSSF and to the AMF, a message for triggering the AMF to update its NSSAI availability information with the NSSF. The method further includes receiving, from the AMF, an NSSAIAvailability PUT request including NSSAI availability information for the AMF. The method further includes updating, by the NSSF, the NSSAI availability information database to include the NSSAI availability information for the AMF.

According to another aspect of the subject matter described herein, receiving a service request from the AMF includes receiving an NSSelection request from the AMF.

According to another aspect of the subject matter described herein, sending a message for triggering the AMF to update its NSSAI availability information with the NSSF includes sending an error response to the NSSelection request including an indication that the NSSAI availability information for the AMF is not present in the NSSAI availability information database maintained by the NSSF.

According to another aspect of the subject matter described herein, the error response comprises a 403 Forbidden response with a custom header indicating that the NSSAI availability information for the AMF is not present in the NSSAI availability information database maintained by the NSSF.

According to another aspect of the subject matter described herein, receiving a service request from the AMF includes receiving an NSSAIAvailability PATCH request from the AMF.

According to another aspect of the subject matter described herein, sending a message for triggering the AMF to update its NSSAI availability information with the NSSF includes sending an error response to the NSSAIAvailability PATCH request including an indication that the NSSAI availability information for the AMF is not present in the NSSAI availability information database maintained by the NSSF.

According to another aspect of the subject matter described herein, the error response comprises a 4XX response with a custom header indicating that the NSSAI availability information for the AMF is not present in the NSSAI availability information database maintained by the NSSF.

According to another aspect of the subject matter described herein, the method for automatically triggering NSSAI availability information updates includes, at the NSSF, rejecting NSSelection requests and NSSAIAvailability PATCH requests from the AMF received prior to the NSSAIAvailability PUT request from the AMF.

According to another aspect of the subject matter described herein, the method for automatically triggering NSSAI availability information updates includes, at the NSSF and after receiving the NSSAIAvailability PUT request from the AMF, receiving, from the AMF, an NSSelection request and, in response, determining whether the NSSF has NSSAI availability information concerning at least one target AMF identified in the NSSelection request, and, in response to determining that the NSSF has the NSSAI availability information concerning the at least one target AMF, responding to the NSSelection request with a 200 OK message containing the NSSAI availability information concerning the at least one target AMF.

According to another aspect of the subject matter described herein, the method for automatically triggering NSSAI availability information updates includes, at the NSSF and after receiving the NSSAIAvailability PUT request from the AMF, receiving, from the AMF, an NSSAIAvailability PATCH request and, in response, determining whether the NSSF has NSSAI availability information concerning the AMF, and, in response to determining that the NSSF has the NSSAI availability information concerning the AMF, responding to the NSSAIAvailability PATCH request indicating successful updating of the NSSAI availability information for the AMF.

According to another aspect of the subject matter described herein, a system for automatically triggering network slice selection assistance information (NSSAI) availability information updates with a network slice selection function (NSSF) is provided. The system includes an NSSF including at least one processor and a memory. The system further includes an NSSAI availability information database stored in the memory. The system further includes an NSSAI availability information update trigger generator for receiving, from an access and mobility management function (AMF), a service request message, determining that NSSAI availability information for the AMF is not present in the NSSAI availability information database, in response to determining that the NSSAI availability information is not present in the NSSAI availability information database, sending, to the AMF, a message for triggering the AMF to update its NSSAI availability information with the NSSF, receiving, from the AMF, an NSSAIAvailability PUT request including NSSAI availability information for the AMF, and updating NSSAI availability information database to include the NSSAI availability information for the AMF.

According to another aspect of the subject matter described herein, the service request from the AMF comprises an NSSelection request from the AMF.

According to another aspect of the subject matter described herein, the message for triggering the AMF to update its NSSAI availability information with the NSSF comprises an error response to the NSSelection request including an indication that the NSSAI availability information for the AMF is not present in the NSSAI availability information database maintained by the NSSF.

According to another aspect of the subject matter described herein, the error response comprises a 403 Forbidden response with a custom header indicating that the NSSAI availability information for the AMF is not present in the NSSAI availability information database maintained by the NSSF.

According to another aspect of the subject matter described herein, the service request from the AMF comprises an NSSAIAvailability PATCH request from the AMF.

According to another aspect of the subject matter described herein, the message for triggering the AMF to update its NSSAI availability information with the NSSF comprises an error response to the NSSAIAvailability PATCH request including an indication that the NSSAI availability information for the AMF is not present in the NSSAI availability information database maintained by the NSSF.

According to another aspect of the subject matter described herein, the error response comprises a 4XX response with a custom header indicating that the NSSAI availability information for the AMF is not present in the NSSAI availability information database maintained by the NSSF.

According to another aspect of the subject matter described herein, the NSSAI availability information update trigger generator is configured to reject NSSelection requests and NSSAIAvailability PATCH requests from the AMF received prior to the NSSAIAvailability PUT request from the AMF.

According to another aspect of the subject matter described herein, the NSSAI availability information update trigger generator is configured to, after receiving the NSSAI-Availability PUT request from the AMF, receive, from the AMF, an NSSelection request and, in response, determine whether the NSSF has NSSAI availability information concerning at least one target AMF identified in the NSSelection request, and, in response to determining that the NSSF has the NSSAI availability information concerning the at least one target AMF, respond to the NSSelection request with a 200 OK message containing the NSSAI availability information concerning the at least one target AMF.

According to another aspect of the subject matter described herein, a non-transitory computer readable medium having stored thereon executable instructions that when executed by a processor of a computer controls the computer to perform steps is provided. The steps include receiving, at a network slice selection function (NSSF) and from an access and mobility management function (AMF), a service request message. The steps further include determining, by the NSSF, that network slice selection assistance information (NSSAI) availability information for the AMF is not present in an NSSAI availability information database maintained by the NSSF. The steps further include, in response to determining that the NSSAI availability information is not present in the NSSAI availability information database, sending, by the NSSF and to the AMF, a message for triggering the AMF to update its NSSAI availability information with the NSSF. The steps further include receiving, from the AMF, an NSSAIAvailability PUT request including NSSAI availability information for the AMF. The steps further include updating, by the NSSF, the NSSAI availability information database to include the NSSAI availability information for the AMF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
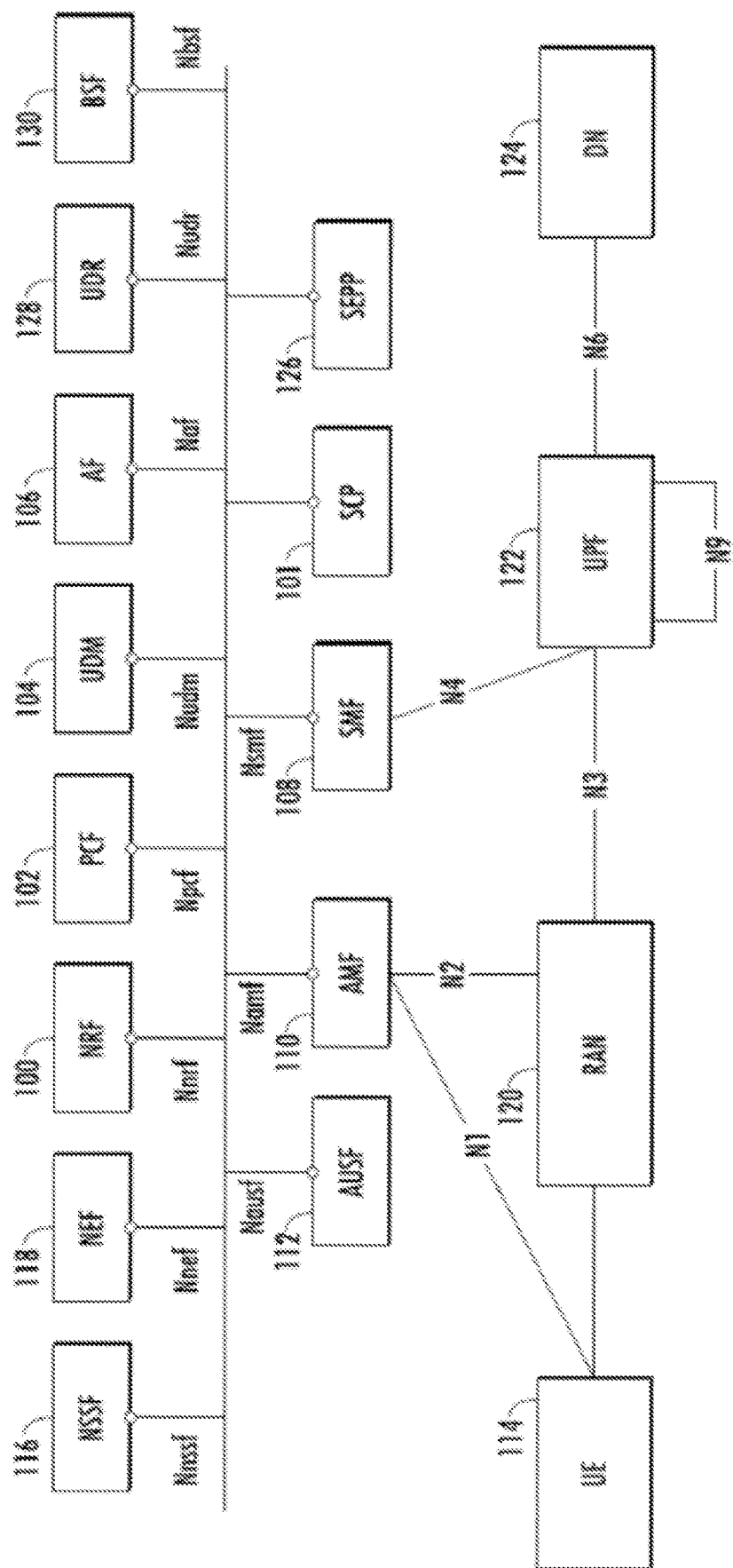
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between AMF 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

NSSF 116 provides network slicing services for devices seeking to access specific network capabilities and characteristics associated with a network slice. As mentioned above, the NSSF provides the NSSelection service, which allows NFs to request information about network slices, and the NSSAIAvailability service, which enables NFs to update and subscribe to receive notification of updates in NSSAI availability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As stated above, one problem that can occur is that the NSSAI availability information database at the NSSF may be empty or out of date due to a service outage at the NSSF or the NSSF being deployed in the network after deployment of AMFs, and there is no 3GPP-defined mechanism for triggering AMFs to provide their NSSAI availability information to the NSSF. The subject matter described herein addresses this deficiency by providing a mechanism for automatically triggering NFs to update their NSSAI availability information with the NSSF.

The NSSelection service is described in 3GPP TS 29.531, Section 5.2. The NSSelection service is used by an NF service consumer (e.g., an AMF or NSSF in a different PLMN) to retrieve information related to a network slice in non-roaming and roaming cases. The NSSelection service also enables the NSSF to provide to the AMF the allowed NSSAIs and the configured NSSAIs for the serving PLMN. For the NSSelection service, the following service operations are defined:

GET

Defining the GET service operation means that other NFs can use this operation to obtain NSSAI availability information from the NSSF. It is important to make sure that the NSSAI availability information at the NSSF is up to date.

Figure 2:
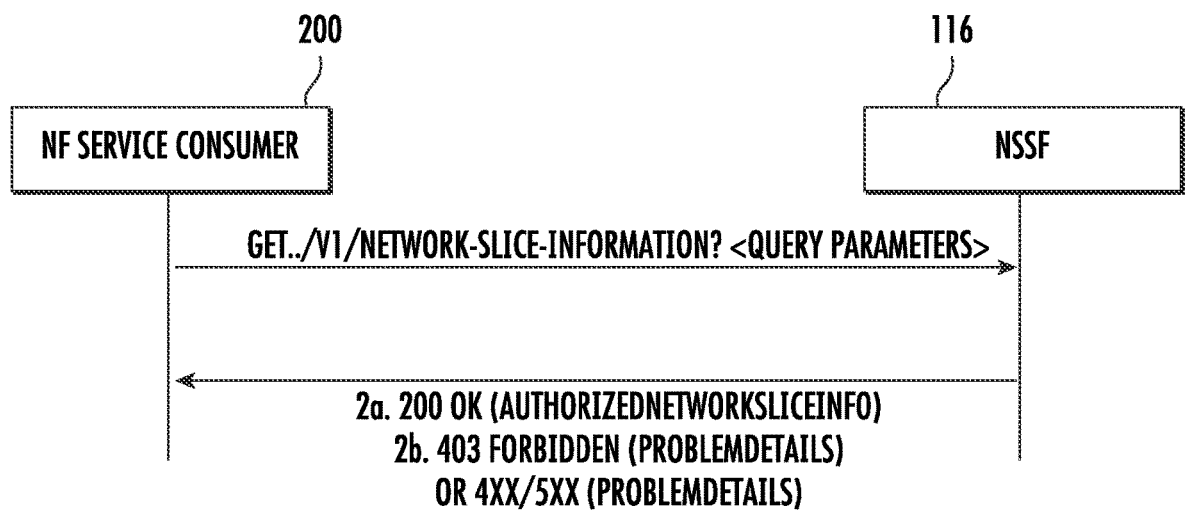
FIG. 2 is a message flow diagram illustrating exemplary messages exchanged in the Nnssf_NSSelection service operation.

FIG. 2 is a message flow diagram illustrating exemplary messages exchanged in the NSSelection service operation. Referring to FIG. 2, in step 1 of the message flow diagram, NF service consumer 200 sends an NSSelection request message to NSSF 116. The NSSelection request message contains an HTTP GET method identifier as well as query parameters to obtain network slice information from NSSF 116. NSSF 116 receives and processes the NSSelection request message. If the processing is successful, NSSF 116 responds as indicated in step 2a with a 200 OK message containing authorized network slice information. If the requesting NF is not authorized to receive the requested network slice information or if an error occurs in processing the NSSelection request message, NSSF 116 responds as indicated by step 2b with a 403 Forbidden message or other 4XX or 5XX message indicating problem details.

The NSSAIAvailability service is defined in 3GPP TS 29.531, Section 5.3. The NSSAIAvailability service is used by the NF service consumer (e.g., an AMF) to update the S-NSSAI(s) that the AMF supports on a per TA basis to the NSSF. The NSSAIAvailability service can also be used to subscribe to and unsubscribe from notification of any changes to the NSSAI availability information on a per TA basis, the S-NSSAIs available per TA (unrestricted), and the restricted S-NSSAI(s) per PLMN in that TA in the serving PLMN of the UE. For the NSSAIAvailability service, the following service operations are defined:

1. Update
2. Subscribe
3. Unsubscribe
4. Notify
5. Delete
6. Options

3GPP TS 29.531, Section 5.3.2.2 describes the update service operation used by an NF service consumer (e.g., an AMF) to update the NSSF with the S-NSSAIs the NF service consumer supports per TA and to subscribe to be notified of changes in the availability of the S-NSSAIs per TA for the S-NSSAIs that another NF service consumer (e.g., another AMF) supports.

One point to highlight is that the NF service consumer (AMF) sends the NSSAI availability information to the NSSF, and the NSSF stores this data for other AMFs to use during registration and PDU establishment. NSSAI availability information is state data updated by the AMF and stored at the NSSF. If the NSSAI availability information at the NSSF is lost or out of date, service disruption can occur.

Figure 3:
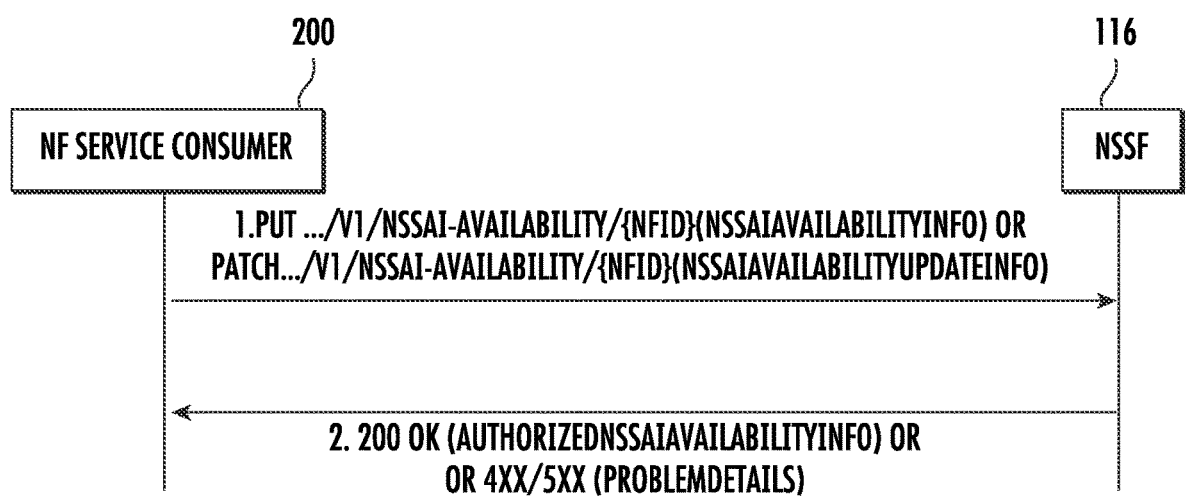
FIG. 3 is a message flow diagram illustrating exemplary messages exchanged in the Nnssf_NSSAIAvailability update operation.

FIG. 3 is a message flow diagram illustrating exemplary messages exchanged in the NSSAIAvailability update operation. Referring to FIG. 3, in step 1 of the message flow diagram, NF service consumer 200 sends an NSSAIAvailability update request message to NSSF 116. If the NSSAI-Availability update request contains an HTTP PUT method identifier, then the update request is a request to fully replace or create NSSAI availability information for the NF identified by the nfId in the message. If the NSSAIAvailability update request contains an HTTP PATCH method identifier, then the request is a request for updating existing NSSAI availability information maintained by the NSSF for the NF identified by the nfId in the message.

NSSF 116 receives and processes the NSSAIAvailability update request message. If the processing is successful, NSSF 116 responds as indicated in step 2a with a 200 OK message containing authorized network slice information. If an error occurs in processing the NSSAIAvailability update request message, NSSF 116 respond as indicated by step 2b with a 4XX or 5XX message containing problem details. If the NSSAIAvailability update request is redirected, NSSF 116 responds with a 3XX message indicating redirection.

It is expected that multiple AMFs may be deployed in some networks and that the AMFs may access services provided by the NSSF. Each AMF sends NSSAI availability information to the NSSF as per 3GPP TS 29.531. The NSSF stores NSSAI availability information for each AMF. The NSSF uses the received NSSAI availability information for the NSSelection service operations from AMFs. The NSSelection service operation is triggered by AMFs during initial registration and PDU session establishment. Also, the NSSF notifies the subscribed AMFs of updates in the NSSAIAvailability data.

Figure 4:
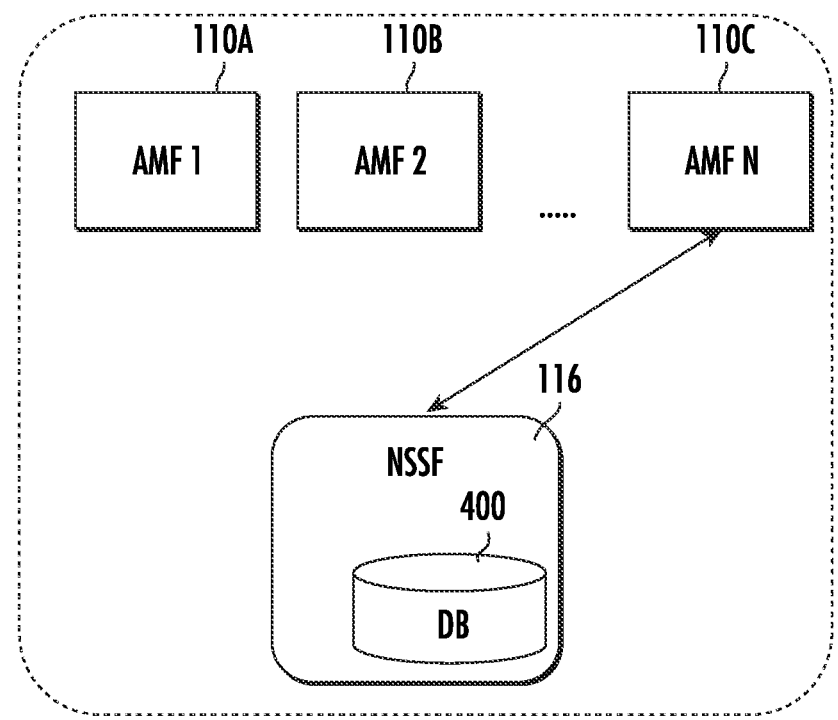
FIG. 4 is network diagram illustrating an exemplary AMF deployment scenario.

FIG. 4 is a network diagram illustrating an exemplary AMF deployment scenario. In FIG. 4, NSSF 116 includes an NSSAI availability information database 400, which stores NSSAI availability information for AMFs 110A, 110B, and 110C. NSSF 116 also uses the data in NSSAI availability information database 400 to provide NSSAI availability information to AMFs 110A, 110B, and 110C.

In some scenarios, the NSSAI availability information database at the NSSF can become empty or out of date. The following are examples of such scenarios:

Because the NSSF is optional in 5G network deployments, the NSSF may be deployed after AMFs are deployed in the network. As a result, when the NSSF is deployed, it will not contain NSSAI availability information for AMFs deployed before the NSSF. In another scenario, if the NSSF is deployed and experiences a service outage, e.g., due to a disaster, the NSSF may lose some or all of the NSSAI availability information stored in the NSSAI availability information database. In either of these scenarios, if the NSSF receives an NSSelection service request, the NSSF responds with a 403 "SNSSAI_NOT_SUPPORTED" error response failing the service request. There is no 3GPP-defined method to build/rebuild the NSSAIAvailability data in the NSSF that causes AMFs to trigger/re-trigger NSSAI-Availability update service request.

Figure 5:
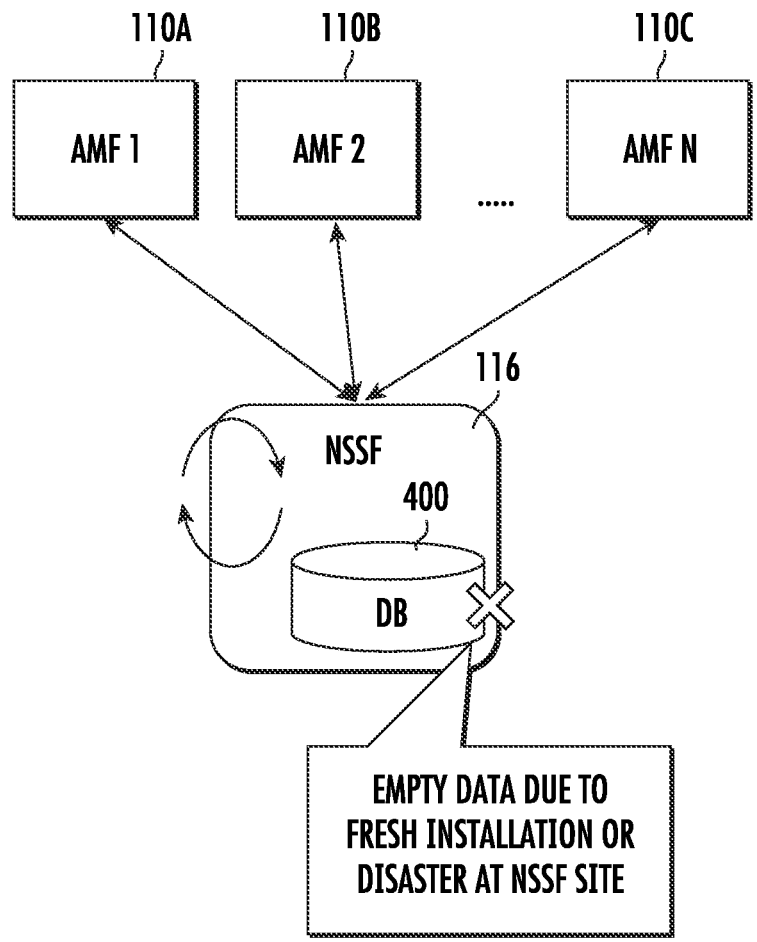
FIG. 5 is a block diagram illustrating the AMF deployment scenario in FIG. 4 where the NSSAI availability information database at the NSSF is empty or out of date.

FIG. 5 is a block diagram illustrating the AMF deployment scenario in FIG. 4 where the NSSAI availability information database at the NSSF is empty or out of date. In FIG. 5, if NSSF 116 is deployed after AMFs 110A, 110B, and 110C, NSSAI availability information database 400 will not have NSSAI availability information for AMFs 110A, 110B, or 110C. Similarly, after a service outage, NSSF 116 may lose its NSSAI availability information stored in NSSAI availability information database 400 for AMFs 110A, 110B, and 110C. Although AMFs 110A, 110B, and 110C may eventually update their NSSAI availability information with NSSF 116, there is no 3GPP-defined mechanism for informing them that their NSSAI availability information is lost or out of date and needs updating. As a result, NSSelection service operations will fail when the requested information is not present in availability information database 400.

To avoid or mitigate at least some of these difficulties, the NSSF causes AMFs to trigger/re-trigger NSSAIAvailability update service requests in order to build/rebuild the NSSAI availability information database. The NSSF maintains a data listing of all the AMFs which have updated the NSSF with their NSSAI availability information. When the NSSF receives an NSSelection service request, the NSSF checks to determine if there is an NSSAIAvailability update, i.e., a record in the NSSAI availability information database containing NSSAI availability information, present from that AMF. If the update is present, then the NSSF processes the NSSelection service request. If the update is not present, then the NSSF sends an error response to the AMF with an indication that NSSF has no NSSAIAvailability data from that AMF and needs a re-trigger. The AMF, on receiving this indication, triggers an NSSAIAvailability update service request to the NSSF. The NSSF, upon receiving the NSSAI-Availability update request, uses the NSSAI availability information contained in the update request to build/rebuild the NSSAI availability information in the NSSAI availability information database, which will in turn be used to respond to NSSelection service requests from AMFs.

Figure 6:
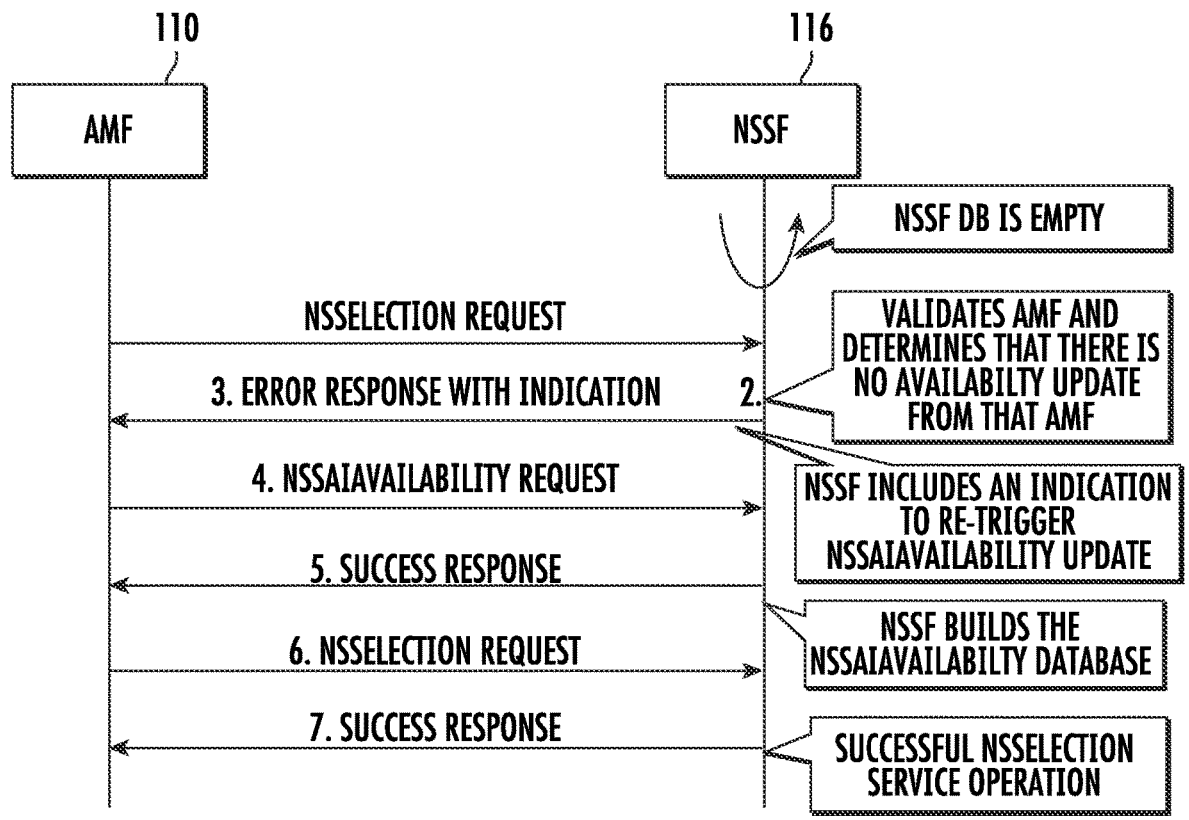
FIG. 6 is a message flow diagram illustrating exemplary messages exchanged for automatically triggering an AMF to update its NSSAI availability information with the NSSF.

FIG. 6 is a message flow diagram illustrating exemplary messages exchanged for automatically triggering an AMF to update its NSSAI availability information with the NSSF. Referring to FIG. 6, in step 1, AMF 110 sends an NSSelection request to NSSF 116. It is assumed that at the time the NSSelection request is received, the NSSAI availability information database at NSSF 116 is empty. In step 2, NSSF 116 validates the AMF and determines that there is no NSSAI availability information stored in the NSSAI availability information database for AMF 110.

In step 3, NSSF 116 sends an error response to AMF 110. NSSF 116 includes in the error response an indication for AMF 110 to update its NSSAI availability information with NSSF 116. In one example, the indication may be carried in a custom header that indicates the lack of NSSAI availability information in the NSSAI availability information database. The custom header may be structured as follows:

Header name:
  Oc-nssaiavailability-data
Header values:
  True (NSSAI availability info present)
  False (NSSAI availability info absent In the example, the custom header contains Boolean values of true or false indicating whether or not the NSSAI availability information is present in or absent from NSSAI availability information database 400 maintained by NSSF 116.

AMF 110 receives the error response with the indication, and, rather than re-attempting the NSSelection request, in step 4, AMF 110 sends an NSSAIAvailability update request to NSSF 116. The NSSAIAvailability update request may be a full update containing an HTTP PUT method identifier to create a new resource for the NSSAI availability information for AMF 110 on NSSF 116. NSSF 116 receives the NSSAI-Availability update request and stores the NSSAI availability information in the NSSAI availability information database. In step 5, NSSF 116 sends a success response to AMF 110 indicating that the NSSAIAvailability update service operation was successful. NSSF 116 may perform steps 2 and 3 for any AMF sending an NSSelection request and whose NSSAI availability information is not updated with in NSSF 116. Using this procedure, NSSF 116 will populate the NSSAI availability information database by triggering AMFs to update their NSSAI availability information with NSSF 116.

In step 6, AMF 110 sends an NSSelection request to NSSF 116. NSSF 116 receives the NSSelection request and determines whether AMF 110 has updated its NSSAI availability information with NSSF 116. Because AMF 110 updated its NSSAI availability information with NSSF 116, in step 4. As a result, NSSF 116 processes the NSSelection request. In step 7, NSSF 116 responds to the NSSelection request with a success response including the NSSAI availability information for the target NF identified in the NSSelection request.

Figure 7:
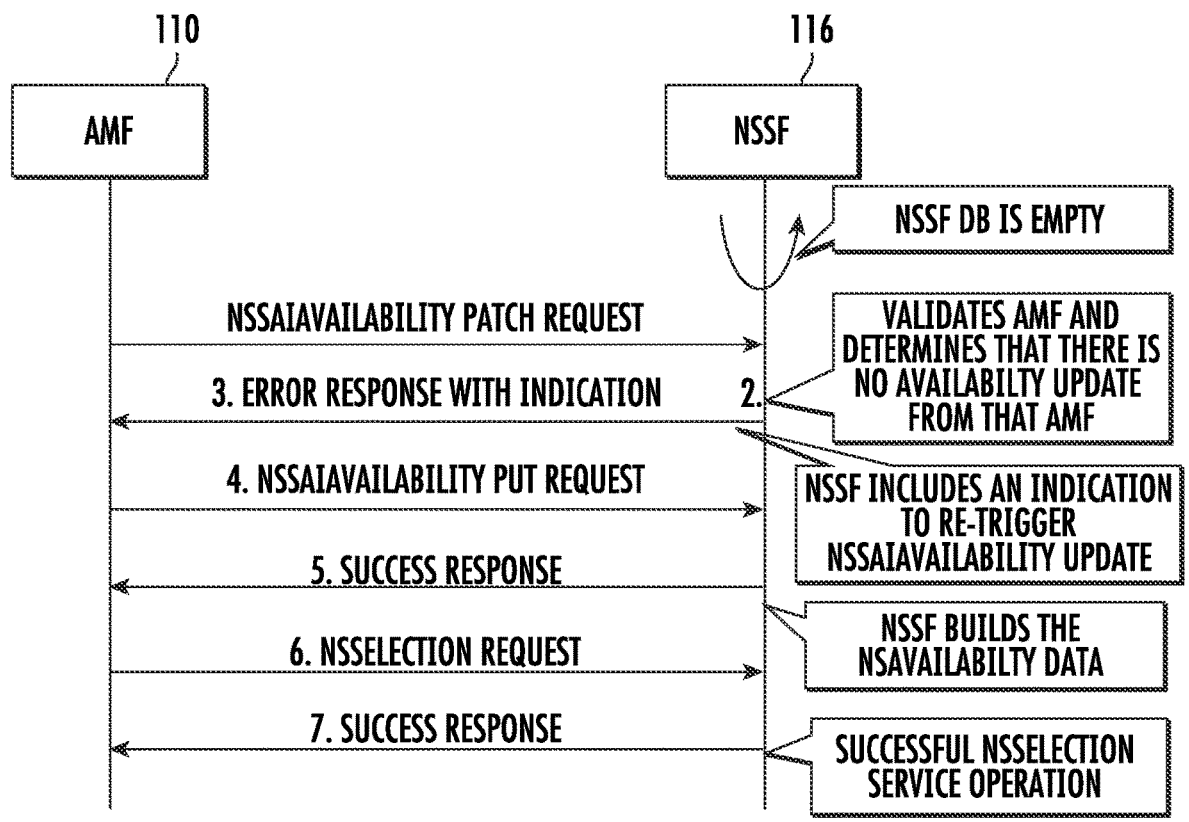
FIG. 7 is a message flow diagram illustrating another example of messages exchanged for automatically triggering an AMF to update its NSSAI availability information with the NSSF.

In the example illustrated in FIG. 6, NSSF 116 triggers AMF 110 to update its NSSAI availability information with NSSF 116 in response to an NSSelection request from AMF 110. The subject matter described herein is not limited to using the NSSelection service operation to trigger NSSAI-Availability updates from AMFs. In addition or alternatively, NSSF 116 may trigger AMFs to update their NSSAI availability information in response to NSSAIAvailability PATCH requests. FIG. 7 is a message flow diagram illustrating exemplary messages exchanged for automatically triggering an AMF to update its NSSAI availability information with the NSSF in response to NSSAIAvailability PATCH requests. Referring to FIG. 7, in step 1, AMF 110 sends an NSSAIAvailability PATCH request to NSSF 116. An NSSAIAvailability PATCH request is a request to update an existing resource with NSSF 116. It is assumed that at the time the NSSAIAvailability PATCH request is received, the NSSAI availability information database at NSSF 116 is empty. In step 2, NSSF 116 validates the AMF and determines that there is no NSSAI availability information stored in the NSSAI availability information database for AMF 110.

In step 3, NSSF 116 sends an error response to AMF 110. NSSF 116 includes in the error response an indication for AMF 110 to update its NSSAI availability information with NSSF 116. In one example, the indication may be carried in a custom header that indicates the lack of NSSAI availability information in the NSSAI availability information database. The custom header may be structed as described above with respect to the NSSelection error response.

AMF 110 receives the error response with the indication then, rather than re-attempting the NSSAIAvailability PATCH request, in step 4, AMF 110 sends an NSSAIAvailability PUT request to NSSF 116. The NSSAIAvailability PUT request is a full update to create a new resource for the NSSAI availability information for AMF 110 on NSSF 116. NSSF 116 receives the NSSAIAvailability PUT request and stores the NSSAI availability information in the NSSAI availability information database. In step 5, NSSF 116 sends a success response to AMF 110 indicating that the NSSAI-Availability update service operation was successful. NSSF 116 may perform steps 2 and 3 for any AMF sending an NSSAIAvailability PATCH request and whose NSSAI availability information is not updated with NSSF 116. Using this procedure, NSSF 116 will populate the NSSAI availability information database by triggering AMFs to update their NSSAI availability information with NSSF 116.

In step 6, AMF 110 sends an NSSelection request to NSSF 116. NSSF 116 receives the NSSelection request and determines that AMF 110 has updated its NSSAI availability information with NSSF 116. As a result, NSSF 116 processes the NSSelection request. In step 7, NSSF 116 responds to the NSSelection request with a success response including the NSSAI availability information for the target NF identified in the NSSelection request.

Once the NSSAI availability information for AMF 110 has been successfully updated in step 4, NSSF 116 may also allow NSSAIAvailability PATCH requests from AMF 110. Accordingly, after step 4, if NSSF 116 receives an NSSAI-Availability PATCH request from AMF 110, NSSF 116 will update the NSSAI availability information for AMF 110 in NSSAIAvailability information database 400 and respond to the NSSAIAvailability PATCH request with a success response message, which may be a 200 OK message if the NSSAIAvailability information is not empty after the update.

Figure 8:
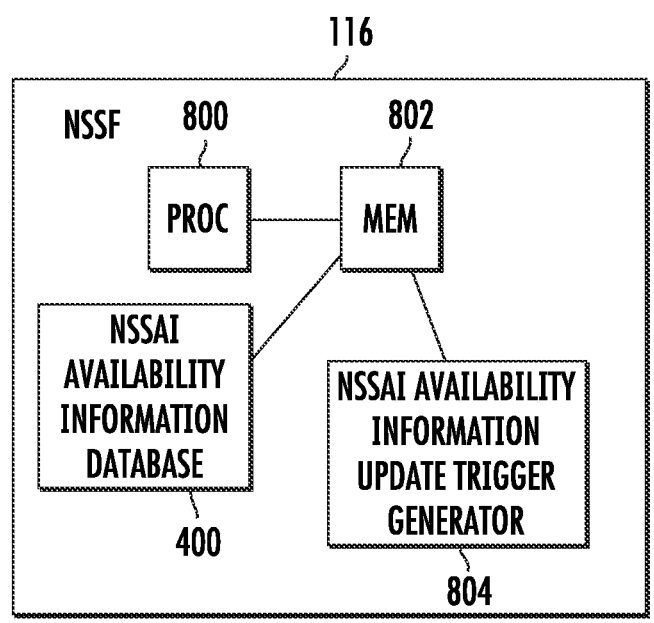
FIG. 8 is a block diagram illustrating an exemplary architecture for an NSSF.

FIG. 8 is a block diagram illustrating an exemplary architecture for an NSSF capable of automatically triggering NSSAI availability information updates with the NSSF. Referring to FIG. 8, NSSF 116 includes at least one processor 800 and a memory 802. NSSF 116 further includes an NSSAI availability information database 400 stored in memory 802. NSSF 116 further includes an NSSAI availability information update trigger generator 804 for automatically triggering updates to NSSAI availability information when NSSAI availability information database 400 lacks NSSAI availability information for one or more NFs. NSSAI availability information update trigger generator 804 may be implemented using computer executable instructions stored in memory 802 and executed by processor 800.

Figure 9:
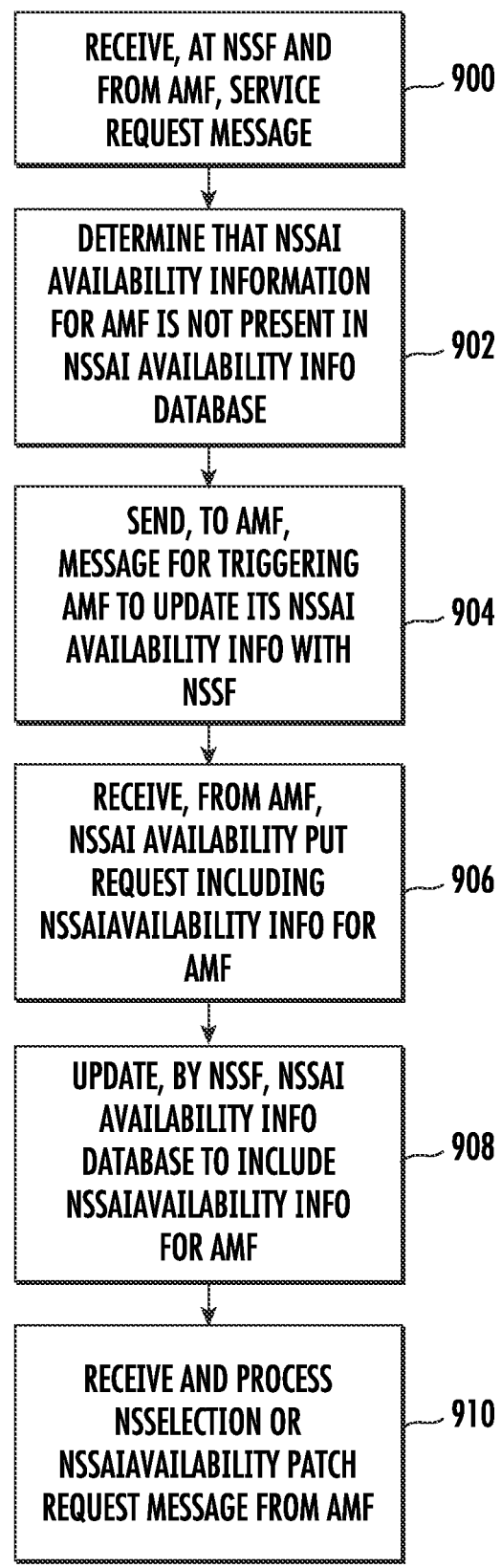
FIG. 9 is a flow chart illustrating an exemplary process for automatically triggering NSSAI availability information updates with the NSSF.

FIG. 9 is a flow chart illustrating an exemplary process for automatically triggering NSSAI availability information updates with the NSSF. Referring to FIG. 9, in step 900, the process includes receiving, at an NSSF and from an AMF, a service request message. For example, NSSF 116 may receive an NSSelection request or an NSSAIAvailability PATCH request from an AMF. If the request is an NSSelection request, the request may identify a target AMF other than the sending AMF. If the request is an NSSAIAvailability PATCH request, the request may identify a resource previously created by the requesting AMF with NSSF 116. In either case, it is assumed that NSSF 116 has lost (or never had) the NSSAI availability information for the requesting AMF, even though the NSSF 116 may have the NSSAI availability information for the target AMF (in the NSSelection case). The loss may be due to NSSF 116 being newly brought into service (after the requesting AMF) or after an outage of NSSF 116.

In step 902, the process includes determining, by the NSSF, that NSSAI availability information for the AMF (i.e., the requesting AMF) is not present in an NSSAI availability information database maintained by the NSSF. As mentioned in the preceding paragraph, NSSF 116 may not have the NSSAI availability information for the requesting AMF because of the relative timing that NSSF 116 was brought into service with respect to the time that the requesting AMF was brought into service or because NSSF 116 is recovering from a service outage.

In step 904, the process includes, in response to determining that the NSSAI availability information is not present in the NSSAI availability information database, sending, by the NSSF and to the AMF, a message for triggering the AMF to update its NSSAI availability information with the NSSF. If the service request message in step 900 is an NSSelection request, the message may be a 403 Forbidden message carrying an indication to the requesting AMF to update its NSSAI availability information with NSSF 116. If the service request message in step 900 is an NSSAIAvailability PATCH request, the message for triggering the AMF to update its NSSAI availability information with NSSF 116 may be a 4XX error response with the indication for the AMF to update its NSSAI availability information with NSSF 116. The indication may be carried in any unused field that is part of the message or that can be attached to the message. In one example, the indication may be a variable having a Boolean value (true or false) to indicate whether or not the NSSF has NSSAI availability information for the requesting NF.

In step 906, the process includes receiving, from the AMF, an NSSAIAvailability PUT request including NSSAI availability information for the AMF. For example, the AMF that sent the service request in step 900 may receive the message with the indication that the AMF should update its NSSAI availability information with NSSF 116, and, in response, generate and send an NSSAIAvailability PUT request including NSSAI availability information for the sending AMF. In one example, the NSSAI availability information may include single network slice selection assistance information (S-NSSAIs) per transfer area (TA) for the sending AMF.

In step 908, the process includes updating, by the NSSF, the NSSAI availability information database to include the NSSAI availability information for the AMF. For example, NSSF 116 may update NSSAI availability information database 400 with the NSSAI availability information received in step 906. NSSF 116 may repeat the process of sending error messages to requesting AMFs in response to NSSelection requests and NSSAIAvailability PATCH requests to trigger the AMFs to update their NSSAI availability information with NSSF 116. Using this procedure, NSSF 116 can trigger the AMFs to automatically populate the NSSAI availability information database at NSSF 116.

In step 910, the process includes receiving and processing an NSSelection request or an NSSAIAvailability PATCH request from the AMF. For example, NSSF 116 may receive an NSSelection or NSSAIAvailability PATCH request, determine that NSSAI availability information exists for the requesting AMF in the NSSAI availability information database, and, in response, successfully process the request.

In the examples described herein, the steps for automatically triggering AMFs to update their NSSAI availability information are described and illustrated as being performed at an NSSF. However, the subject matter described herein is not limited to performing these steps at an NSSF. The steps described herein can be performed at an NF that maintains a availability information database of NSSAI availability information that is accessed and updated by other NFs, such as AMFs.

Advantages of the subject matter described herein include the ability for the NSSF to automatically build/rebuild the NSSAI availability information database from scratch. The operational hassle of manually configuring/building the NSSAI availability information database is avoided. The subject matter described herein also avoids the operational hassle of manual configuration of a newly installed NSSF that needs to be updated with all of the AMFs' current NSSAI supported information. Using the NSSF to control NSSAIAvailability updates from AMFs provides centralized control over the mechanism and timing of updates and is believed to be advantageous over allowing individual AMFs to determine when to update their NSSAI availability information with the NSSF. Using the methodology described herein, for every NSSelection and/or NSSAIAvailability PATCH request, there will be a service request failure (because the NSSF sends a failure response to the requesting AMF) until a new NSSAIAvailability PUT request is sent from the requesting AMF. The solution described herein is fully backward compatible with 3GPP defined service operations and provides fault tolerance for NSSF implementations.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 17) 3GPP TS 29.510 V17.6.0 (2022-06)
2. 3$^{rd}$ Generation Partnership Project; Technical Specification Group Core Network and Terminals; 5G System; Network Slice Selection Services; Stage 3 (Release 17) 3GPP TS 29.531 V17.5.0 (2022-06)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatically triggering network slice selection assistance information (NSSAI) availability information updates with a network slice selection function (NSSF), the method comprising:
   receiving, at an NSSF and from an access and mobility management function (AMF), a service request message;
   determining, by the NSSF, that NSSAI availability information of the AMF, which identifies network slices supported by the AMF, is not present in an NSSAI availability information database of the NSSF and maintained by the NSSF;
   in response to the service request message and determining that the NSSAI availability information of the AMF that sent the service request message is not present in the NSSAI availability information database, sending, by the NSSF and to the AMF, a message for triggering the AMF to update, with the NSSF, the NSSAI availability information of the AMF that sent the service request message;
   receiving, from the AMF and in response to the message for triggering the AMF to update the NSSAI availability information of the AMF with the NSSF, an NSSAI-Availability PUT request including the NSSAI availability information of the AMF; and
   updating, by the NSSF, the NSSAI availability information database to include the NSSAI availability information of the AMF.

2. The method of claim 1 wherein receiving a service request from the AMF includes receiving an NSSelection request from the AMF.

3. The method of claim 2 wherein sending a message for triggering the AMF to update the NSSAI availability information of the AMF with the NSSF includes sending an error response to the NSSelection request including an indication that the NSSAI availability information of the AMF is not present in the NSSAI availability information database of the NSSF and maintained by the NSSF.

4. The method of claim 3 wherein the error response comprises a 403 Forbidden response with a custom header indicating that the NSSAI availability information of the AMF is not present in the NSSAI availability information database of the NSSF and maintained by the NSSF.

5. The method of claim 1 wherein receiving a service request from the AMF includes receiving an NSSAIAvailability PATCH request from the AMF.

6. The method of claim 5 wherein sending a message for triggering the AMF to update, with the NSSF, the NSSAI availability information of the AMF with the NSSF includes sending an error response to the NSSAIAvailability PATCH request including an indication that the NSSAI availability information of the AMF is not present in the NSSAI availability information database of the NSSF and maintained by the NSSF.

7. The method of claim 6 wherein the error response comprises a 4XX response with a custom header indicating that the NSSAI availability information of the AMF is not present in the NSSAI availability information database of the NSSF and maintained by the NSSF.

8. The method of claim 1 comprising, at the NSSF, rejecting NSSelection requests and NSSAIAvailability PATCH requests from the AMF received prior to the NSSAI-Availability PUT request from the AMF.

9. The method of claim 1 comprising, at the NSSF and after receiving the NSSAIAvailability PUT request from the AMF, receiving, from the AMF, an NSSelection request and, in response, determining whether the NSSF has NSSAI availability information concerning at least one target AMF identified in the NSSelection request, and, in response to determining that the NSSF has the NSSAI availability information concerning the at least one target AMF, responding to the NSSelection request with a 200 OK message containing the NSSAI availability information concerning the at least one target AMF.

10. The method of claim 1 comprising, at the NSSF and after receiving the NSSAIAvailability PUT request from the AMF, receiving, from the AMF, an NSSAIAvailability PATCH request and, in response, determining whether the NSSF has NSSAI availability information concerning the AMF, and, in response to determining that the NSSF has the NSSAI availability information concerning the AMF, responding to the NSSAIAvailability PATCH request indicating successful updating of the NSSAI availability information for the AMF.

11. A system for automatically triggering network slice selection assistance information (NSSAI) availability information updates with a network slice selection function (NSSF), the system comprising:
an NSSF including at least one processor and a memory;
an NSSAI availability information database of the NSSF stored in the memory of the NSSF; and
an NSSAI availability information update trigger generator implemented by the at least one processor of the NSSF for receiving, from an access and mobility management function (AMF), a service request message, determining that NSSAI availability information of the AMF, which identifies network slices supported by the AMF, is not present in the NSSAI availability information database, in response to determining that the NSSAI availability information of the AMF that sent the service request message is not present in the NSSAI availability information database, sending, to the AMF, a message for triggering the AMF to update, with the NSSF, the NSSAI availability information of the AMF that sent the service request message, receiving, from the AMF and in response to the message for triggering the AMF to update the NSSA availability information of the AMF with the NSSF, an NSSAIAvailability PUT request including the NSSAI availability information of the AMF, and updating NSSAI availability information database to include the NSSAI availability information of the AMF.

12. The system of claim 11 wherein the service request from the AMF comprises an NSSelection request from the AMF.

13. The system of claim 12 wherein the message for triggering the AMF to update the NSSAI availability information of the AMF with the NSSF comprises an error response to the NSSelection request including an indication that the NSSAI availability information of the AMF is not present in the NSSAI availability information database of the NSSF and maintained by the NSSF.

14. The system of claim 13 wherein the error response comprises a 403 Forbidden response with a custom header indicating that the NSSAI availability information of the AMF is not present in the NSSAI availability information database of the NSSF and maintained by the NSSF.

15. The system of claim 11 wherein the service request from the AMF comprises an NSSAIAvailability PATCH request from the AMF.

16. The system of claim 15 wherein the message for triggering the AMF to update the NSSAI availability information of the AMF with the NSSF comprises an error response to the NSSAIAvailability PATCH request including an indication that the NSSAI availability information of the AMF is not present in the NSSAI availability information database of the NSSF and maintained by the NSSF.

17. The system of claim 16 wherein the error response comprises a 4XX response with a custom header indicating that the NSSAI availability information of the AMF is not present in the NSSAI availability information database of the NSSF and maintained by the NSSF.

18. The system of claim 11 wherein the NSSAI availability information update trigger generator is configured to reject NSSelection requests and NSSAIAvailability PATCH requests from the AMF received prior to the NSSAIAvailability PUT request from the AMF.

19. The system of claim 11 wherein the NSSAI availability information update trigger generator is configured to, after receiving the NSSAIAvailability PUT request from the AMF, receive, from the AMF, an NSSelection request and, in response, determine whether the NSSF has NSSAI availability information concerning at least one target AMF identified in the NSSelection request, and, in response to determining that the NSSF has the NSSAI availability information concerning the at least one target AMF, respond to the NSSelection request with a 200 OK message containing the NSSAI availability information concerning the at least one target AMF.

20. A non-transitory computer readable medium having stored thereon executable instructions that when executed by a processor of a computer controls the computer to perform steps comprising:
receiving, at a network slice selection function (NSSF) and from an access and mobility management function (AMF), a service request message;
determining, by the NSSF, that network slice selection assistance information (NSSAI) availability information of the AMF, which identifies network slices supported by the AMF, is not present in an NSSAI availability information database of the NSSF and maintained by the NSSF;
in response to the service request message and determining that the NSSAI availability information of the AMF that sent the service request message is not present in the NSSAI availability information database, sending, by the NSSF and to the AMF, a message for triggering the AMF to update, with the NSSF, the NSSAI availability information of the AMF that sent the service request message;

receiving, from the AMF and in response to the message for triggering the AMF to update the NSSAI availability information of the AMF with the NSSF, an NSSAI-Availability PUT request including the NSSAI availability information of the AMF; and updating, by the NSSF, the NSSAI availability information database to include the NSSAI availability information of the AMF.

\* \* \* \* \*